(12) United States Patent
Sandepudi et al.

(10) Patent No.: US 11,907,867 B2
(45) Date of Patent: Feb. 20, 2024

(54) IDENTIFICATION AND SUGGESTION OF RULES USING MACHINE LEARNING

(71) Applicant: PayPal, Inc., San Jose, CA (US)

(72) Inventors: Ravi Sandepudi, Hyderabad (IN); Ayaz Ahmad, Hyderabad (IN); Charles Poli, London (GB); Samira Golsefid, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1150 days.

(21) Appl. No.: 16/565,183

(22) Filed: Sep. 9, 2019

(65) Prior Publication Data

US 2020/0387835 A1    Dec. 10, 2020

(30) Foreign Application Priority Data

Jun. 5, 2019  (IN) .............................. 201941022292

(51) Int. Cl.
    *G06N 5/025*    (2023.01)
    *G06N 7/02*     (2006.01)
    *G06N 5/01*     (2023.01)
(52) U.S. Cl.
    CPC ............... *G06N 7/023* (2013.01); *G06N 5/01* (2023.01)
(58) Field of Classification Search
    CPC ..... G06N 5/00–025; G06N 7/00; G06N 20/00
    See application file for complete search history.

(56) References Cited

U.S. PATENT DOCUMENTS

| 2003/0229605 | A1* | 12/2003 | Herrera | ............... | G06N 5/046 |
| | | | | | 706/47 |
| 2014/0282856 | A1* | 9/2014 | Duke | ............... | H04L 63/20 |
| | | | | | 726/1 |
| 2016/0036844 | A1* | 2/2016 | Kopp | ............... | G06N 5/045 |
| | | | | | 726/1 |
| 2018/0046939 | A1* | 2/2018 | Meron | ............... | G06F 21/00 |

(Continued)

FOREIGN PATENT DOCUMENTS

JP         2019-023920       *   2/2019

OTHER PUBLICATIONS

Johnson et al. "A decision-tree-based symbolic rule induction system for text categorization", 2002, IBM Systems Journal, vol. 41, No. 3.*

*Primary Examiner* — Jue Louie
(74) *Attorney, Agent, or Firm* — HAYNES AND BOONE, LLP (57) ABSTRACT

Pure machine learning classification approaches can result in a "black box" solution where it is impossible to understand why a classifier reached a decision. This disclosure describes generating new classification rules leveraging machine learning techniques. New rules may have to meet evaluation criteria. Legibility of those rules can be improved for understanding. A machine learning classifier can be created that is used to identify possible candidate classification rules (e.g. from a group of decision trees such as a random forest classifier). Classification rules generated with the assistance of machine learning may allow for identification of transaction fraud or other classifications that a human analyst would be unable to identify. A selection process can identify which possible candidate rules are effective. The legibility of those rules can then be improved so that they can be more easily understood by humans.

20 Claims, 5 Drawing Sheets

(56) References Cited

U.S. PATENT DOCUMENTS

| | | | |
|---|---|---|---|
| 2020/0190585 A1* | 6/2020 | Wassmann | A61P 35/00 |
| 2020/0242417 A1* | 7/2020 | Sagi | G06K 9/6282 |
| 2020/0257927 A1* | 8/2020 | Nomi | G06N 20/00 |
| 2020/0302318 A1* | 9/2020 | Hetherington | G06N 5/025 |
| 2020/0394659 A1* | 12/2020 | Qu | G06Q 40/02 |

* cited by examiner

FIG. 1

| Event ID | Account ID | Type | IP Address | Transaction Amt | Timestamp | Fraud Status |
|---|---|---|---|---|---|---|
| 7987446564 | 1234 | Debit | 173.0.88.2 | $5.48 | 20170428134751 | Not Fraud |
| 345235896 | 5678 | ACH | 172.217.11.228 | $89.98 | 20170301002133 | Not Fraud |
| 563454210 | 7890 | Balance | 128.42.206.11 | $2.00 | 20161225200205 | Not Fraud |
| 98234771 | 5678 | CC | 104.20.84.19 | $323.42 | 20170301000917 | Fraud |
| 202 | 204 | 206 | 208 | 210 | 212 | 214 |

Records 200

Access a machine learning classifier comprising a plurality of decision trees
410

For each of one or more candidate trees of the plurality of decision trees, evaluate a plurality of branch paths in that candidate tree for transaction classification performance
420

Based on the evaluation, identify one or more candidate transaction classification rules
430

IDENTIFICATION AND SUGGESTION OF RULES USING MACHINE LEARNING

RELATED APPLICATIONS

This application claims the benefit of Indian provisional patent application 201941022292 filed on Jun. 5, 2019.

TECHNICAL FIELD

This disclosure relates to machine learning, and more particularly, to identifying and suggesting data classification rules using machine learning classifiers and other associated technology.

BACKGROUND

Institutions such as credit card companies and banks may use various fraud detection rules. An example of such a rule might be "if a purchase occurs in a country other than the account holder's country of residence, and the purchase is for greater than $1,000, then deny the transaction." These fraud detection rules are frequently written by human analysts.

Relying on human analysts to write fraud detection rules, however, can cause fraud patterns to be identified later than would be desirable, or even overlooked entirely. Applicant recognizes that there is an opportunity to provide better techniques for identifying fraud detection rules, and that this goal can be achieved using machine learning techniques discussed in further detail below.

DETAILED DESCRIPTION

Human written fraud detection rules are often easily understood and with an identifiable purpose. If a human fraud analyst notices many fraudulent charges involving expensive jewelry in the city of Moscow, Russia, for example, the analyst could write a rule along the lines of:
   If (City==Moscow) && (Country==Russia) &&
      (ItemType==Jewelry)
      && (Value>$999.99)
   then DENY TRANSACTION
Such a rule is logical and understandable.

In contrast, fraud detection rules that are generated using a "black box" machine learning (ML) type of solution, however, can result in decisions that cannot be understood by a human. In the example above, a specific rule relates to expensive jewelry purchases in Moscow, Russia. A classification decision generated through machine learning techniques, however, may have no clear reason for the ultimate decision. A machine learning model, for example, could deny a transaction if these conditions are met:
   (Var1>0.342345) && (Var2<9.871223) &&
      (Value>$514.17)
      && (MoscowCity>0.5) && (Var3>0.11231) &&
         (Var4>2.225)
      && (Var9<123.7)
In this example, Var1, Var2, etc. may be any various data related to a transaction.

The above ML-based decision is not readily understood by a human, even if it may be effective at combatting fraud. A human could find it difficult or impossible to understand exactly what kind(s) of fraud this statement may be capturing. Such a statement might even capture multiple types of fraud, rather than just one fraud pattern. This can further complicate understandability. Some evaluators of risk therefore might want to avoid "black box" style machine learning solutions, as machine learning-based fraud detection may not allow the humans in charge of setting policy for fraud response to have any insight into the decisions being made by the ML model.

This disclosure allows the advantages of machine learning to be combined with the advantages of human-written classification rules. Specifically, a machine learning classifier can be created that is then used to identify possible candidate classification rules that might be impossible for a human to identify. (Note that while certain techniques discussed herein are described relative to the example of transaction fraud detection, but techniques are generalizable to other kinds of machine learning environments and classification problems.)

Fraud detection rules generated with the assistance of machine learning technology may allow for the identification of fraud patterns before a human analyst would be able to spot the pattern. Machine learning techniques may also allow some patterns and types of fraud to be identified that a human analyst simply could not identify.

This disclosure describes generating possible candidate classification rules using machine learning assisted techniques. A selection process can then identify which of those possible candidate rules are suitable (e.g. effective enough) to be presented to a user. The legibility/understandability of those rules can then be improved so that they can be more easily understood by humans, according to various embodiments.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
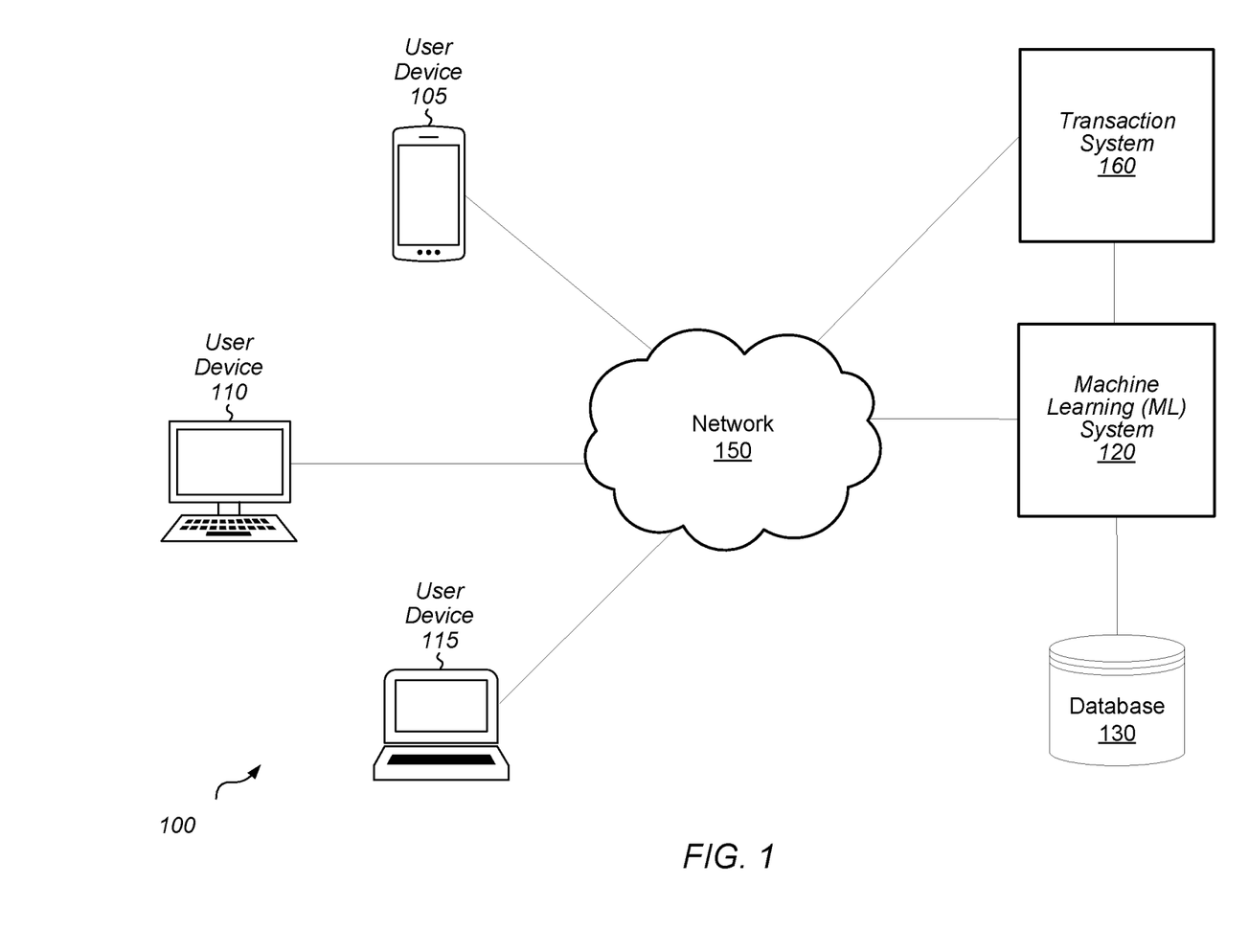
FIG. 1 illustrates a block diagram of a system that includes users devices, a machine learning system, a transaction system, a network, and a database according to some embodiments.

Turning to FIG. 1, a block diagram of a system 100 is shown. In this diagram, system 100 includes user devices 105, 110, 115, a machine learning system 120, a transaction system 160, and a network 150. Also depicted is database 130. This system is usable with various techniques discussed below.

Other permutations of FIG. 1 are contemplated, as with all figures herein. While certain connections are shown (e.g. data link connections) between different components, in various embodiments, additional connections and/or components may exist that are not depicted. Further, components may be combined with one other and/or separated into one or more systems.

User devices 105, 110, and 115 may be any type of computing device. Thus, these devices can be a smartphone, laptop computer, desktop computer, tablet computer, etc. As discussed below, user devices such as 105, 110, and 115 may engage in various actions, including transactions, using transaction system 160. Machine learning system 120 may comprise one or more computing devices each having a processor and a memory, as may transaction system 160. Network 150 may comprise all or a portion of the Internet. User devices 105, 110, and 115 may have particular characteristics that may be used in determining whether to allow a particular electronic payment transaction. Transactions conducted by user devices 105, 110, and 115 may also have other associated data that can determine whether a fraud detection system will allow a particular payment transaction.

Machine learning (ML) system 120 can take operations related to creating, training, and/or operating a machine learning based program that can make predictions/decisions regarding data, according to various embodiments. ML system 120 may also identify, edit, and suggest candidate transaction classification rules—e.g., rules that may determine whether or not a particular transaction is likely to be a fraudulent transaction or not.

Note that different aspects of operations described relative to machine learning system 120 (as well as other systems described herein) can be performed by two or more different computer systems in some embodiments. Techniques described relative to ML system 120 can be applied in a number of different contexts other than financial transaction risk assessment, although many examples below will be explained in relation to that concept.

Transaction system 160 may correspond to an electronic payment service such as that provided by PayPal™. Transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices 105, 110, and 115 can be used to access electronic payment accounts such as those provided by PayPal™ In various embodiments, quantities other than currency may be exchanged via transaction system 160, including but not limited to stocks, commodities, gift cards, incentive points (e.g. from airlines or hotels), etc.

Database 130 includes records related to various transactions taken by users of transaction system 160. These records can include any number of details, such as any information related to a transaction or to an action taken by a user on a web page or an application installed on a computing device (e.g., the PayPal app on a smartphone). Many or all of the records in records database 130 are transaction records including details of a user sending or receiving currency (or some other quantity, such as credit card award points, cryptocurrency, etc.). Data in database 130 may be used to train a machine learning classifier, in various embodiments. And in some embodiments, data for machine learning tasks other than financial transaction risk assessment can be stored in database 130 and used to train a classifier.

Figure 2:
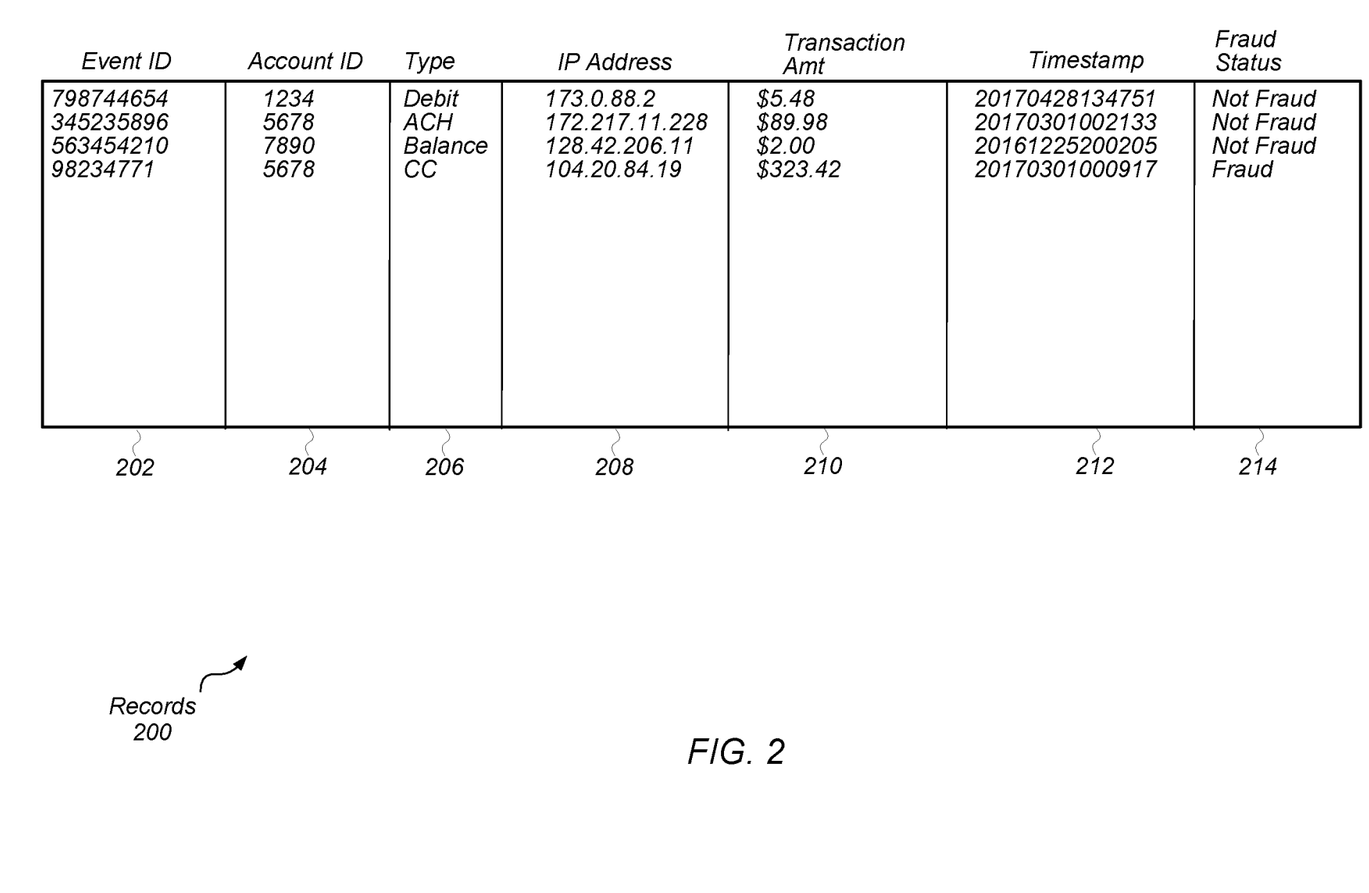
FIG. 2 illustrates a block diagram of a set of data records that can be used as a basis for creating a machine learning classifier, according to some embodiments.

Turning to FIG. 2, a block diagram is shown of one embodiment of records 200 that may be used as a basis for creating a machine learning classifier. Only four records are shown, but when creating a machine learning classifier for transaction classification, many more records may be used. Records 200 may be contained in database 130, for example (although database 130 may include many additional types of data as well). In this example, the records shown include various charges made by different funding mechanisms.

As shown, field 202 includes an event ID. This may be a globally unique event identifier within an enterprise associated with transaction system 160. Thus, in one embodiment, the event ID in field 202 includes a unique ID for each of millions of electronic payment transactions processed by a service provider such as PayPal™. Field 204 includes a unique account ID for a user.

Field 206 includes type of transaction. In this example, rows 1 and 4 are a credit card ("CC") funded transaction, while row 2 is an Automated Clearinghouse (ACH) funded transaction. Row 3 is a balance funded transaction (e.g. a user had a pre-existing currency balance in her account that was used to pay another entity). Additional types of transactions and/or more specific information is also possible in various embodiments (e.g., different types of credit card networks could be specified, such as VISA™ or MASTERCARD™).

Fields 208 and 210 represent an IP address and a transaction amount (which may be specified in a particular currency such as US Dollars, Great Britain Pounds, etc.). The IP address might be the IP address of the user at the time the transaction was conducted, for example. Field 212 includes a transaction timestamp. In the examples shown, the timestamps are in the format (year) (two-digit month) (two-digit day) (hour) (minute) (seconds), but may be in any other format in various embodiments. Field 214 indicates a fraud status—that is, whether the transaction was determined to be fraudulent (e.g. an account holder reported the transaction as fraud) or whether the transaction was found not fraudulent (e.g., a time period within which a user is allowed to report a fraud has passed, the user has lost the right to dispute the transaction, and thus the transaction is deemed to be non-fraudulent).

Many additional pieces of information may be present in records database 130 in various embodiments. An email address associated with an account (e.g. which can be used to direct an electronic payment to a particular account using only that email address) can be listed. Home address, phone number, and any number of other personal details can be listed. Further, in various embodiments, databases may include event information on actions associated payment transaction, such as actions taken relative to a website, or relative to an application installed on a device such as the PayPal application on a smartphone. Database information can therefore include web pages visited (e.g., did a user travel to www.PayPal.com from www.eBay.com, or from some other domain?), order in which the pages were visited, navigation information, etc. Database information can include actions taken within an application on a smartphone such as the PayPal™ app. Database information can also include a location of where a user has logged into (authenticated) an account; unsuccessful login attempts (including IP address etc.); time of day and/or date of week for any event mentioned herein; funding sources added or removed and accompanying details (e.g. adding a bank account to allow currency to be added to or withdrawn from a user account), address or other account information changes, etc. In other words, a large variety of information can be obtained and used to determine the riskiness of a transaction (and this same information can be used to train a machine learning model that includes an ensemble classifier to assess risk).

Figure 3:
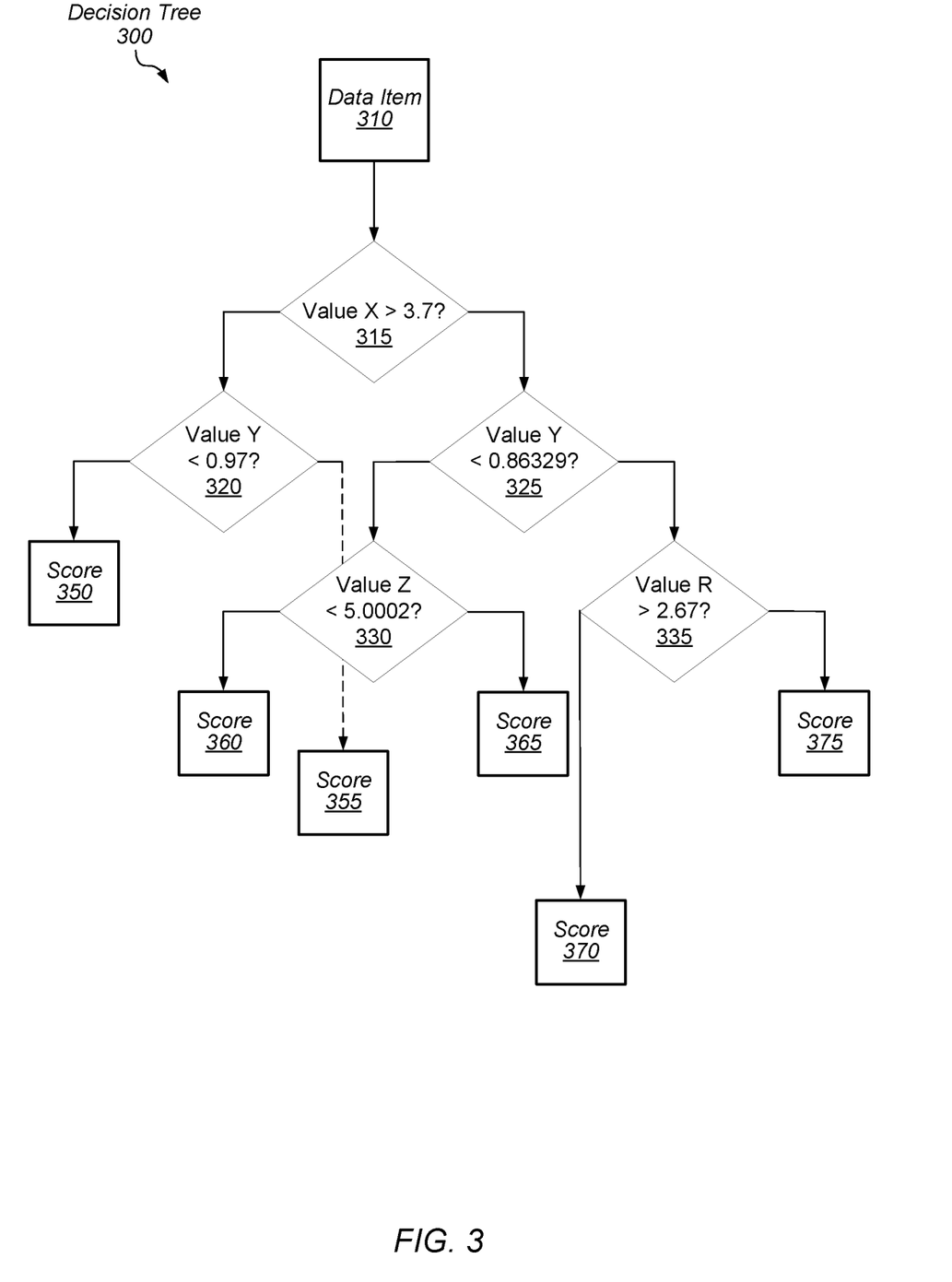
FIG. 3 illustrates a block diagram of an example individual decision tree relating to ensemble machine learning techniques, according to some embodiments.

Turning to FIG. 3, a block diagram is shown of an example individual decision tree 300 relating to ensemble machine learning techniques. All aspects of this system may be implemented using computer software instructions, in various instances.

In this example, data item 310 is fed into the decision tree. Data item 310 can be any particular data having attribute values (i.e. feature values) for various data attributes (i.e. features). Thus, data item 310 may be an electronic payment transaction, or data representative of some other type of item, event, and/or process. The term "attribute value" (or feature value) is used variously herein to refer to an actual data value (e.g. true or false, numerical value, categorical value, etc.). The term "data attribute" (or feature) is used variously to refer to the type of data. Thus, for an electronic payment transaction, a "data attribute" may be the amount of the transaction (e.g. in currency), and an "attribute value" could be $15.99.

At decision point 315, an attribute value for data attribute X is assessed. If the value of X is greater than 3.7, the decision tree will proceed to the right, otherwise it will proceed to the left (all such decision points in this example figure will operate in this manner—proceeding to the right if the condition is satisfied, otherwise proceeding to the left).

Proceeding left, the decision tree will assess the value of data attribute Y at decision point 320 (is the value for Y less than 0.97 for data item 310)? Depending on the value of Y, the decision tree will then terminate at score 350 or score 355 for data item 310.

The resulting score (e.g. score 350) for a data item can take a number of forms. In some cases, it will simply be a yes/no (true/false) decision—e.g., yes, this electronic transaction payment appears fraudulent, or no, this digital image does not appear to contain a picture of a cat. In other embodiments, the score may be a numeric assessment—e.g., on a 0 to 100 scale, where 100 represents a high or absolute certainty that a transaction is fraudulent and 0 represents a high or absolute certainty that a transaction is legitimate. Various scoring schemes for the output of a decision tree are possible. In many (if not all) cases, trees that are part of an ensemble machine learning classifier will all produce scores of the same format.

If the decision tree proceeds right from decision point 315, it will progress to decision point 325 where the value of data attribute Y will be assessed. Depending on this value, the decision tree will then progress to decision point 330 or 335, at which point a further evaluation will be made relative to data attributes Z and R respectively. The tree will then result in one of scores 360, 365, 370, or 375.

Different decision tree formats may be used in various embodiments. Trees may vary in depth, number of data attributes assessed, etc. The tree shown in FIG. 3 features bipartite decision making (two choices on decision points) but tripartite or other formats are also possible.

As noted above, a trained classifier can include many different decision trees. These trees may examine different data attributes in different combinations and values to reach a final assessment (score). These resulting scores from different trees can then be combined (e.g. averaged, weighted average, or some other form) to produce a final result for an unknown data item. But not all of these trees may be equally useful—some may overperform, and some may underperform. When identifying possible candidate classification rules (e.g. new rules to suggest to a human analyst for inclusion in a classification platform), underperforming decision trees may be skipped during an evaluation process.

Figure 4:
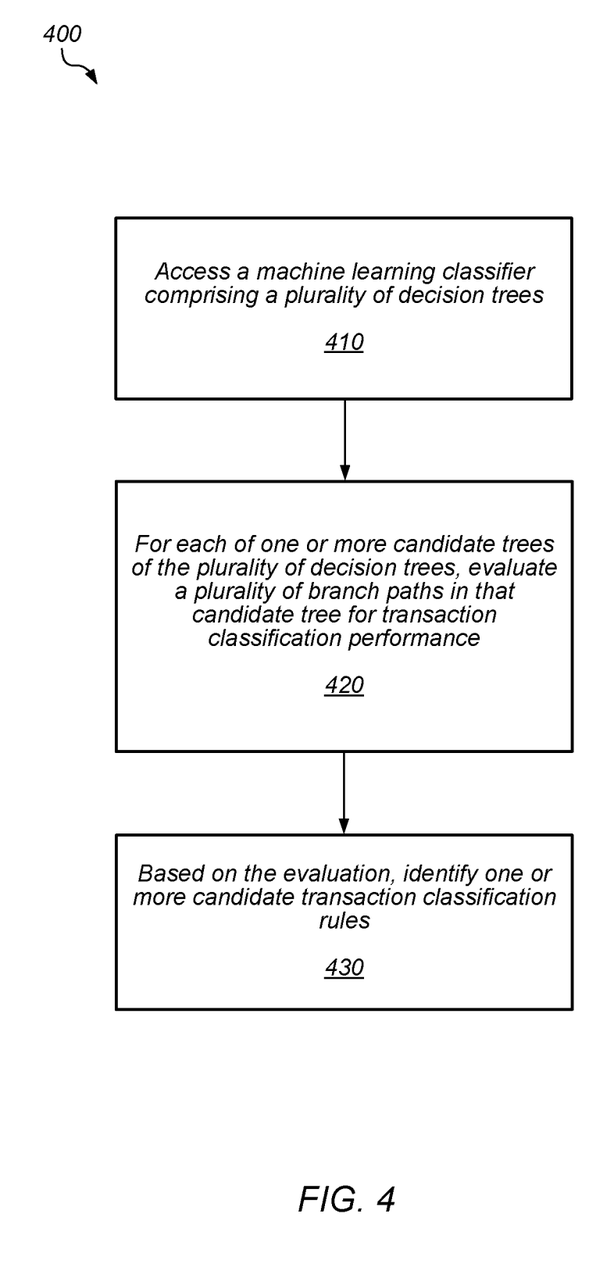
FIG. 4 illustrates a flowchart of a method relating to identifying candidate transaction classification rules using one or more trees from a decision tree machine learning classifier, according to some embodiments.

Turning to FIG. 4, a flowchart is shown of a method 400 relating to identifying candidate transaction classification rules using one or more trees from a decision tree machine learning classifier, according to various embodiments. Operations described relative to FIG. 4 may be performed, in various embodiments, by any suitable computer system and/or combination of computer systems, including ML system 120.

For convenience and ease of explanation, operations described below will simply be discussed relative to ML system 120 rather than any other system, however. Further, various elements of operations discussed below may be modified, omitted, and/or used in a different manner or different order than that indicated. Thus, in some embodiments, ML system 120 may perform one or more operations while another system might perform one or more other operations.

In operation 410, ML system 120 accesses a machine learning classifier comprising a plurality of decision trees, according to various embodiments. This machine learning classifier may be built by ML system 120 (or another system), and is built using transaction data for a plurality of transactions, where each of the plurality of transactions has a plurality of associated feature values for a feature space comprising a plurality of features, according to some embodiments.

A transaction can have various information associated with it that can be used to determine whether the transaction is high risk (e.g. likely to be a fraudulent purchase of some kind). This information can include the price of the item(s) being purchased, the location of the purchase, the location of a buyer associated with the purchase, device information about a buyer device or a seller device, the type of funding source (e.g. debit card, credit card, gift card, bank savings account, etc.), and many other types of information.

Accordingly, the universe of all information related to a transaction can be considered a "feature space" in various embodiments. Within this feature space, particular transactions may have particular values for different features. A given transaction does not need to have a value for each one of the different features (some can be undefined or a default value, for example), but every transaction must have at least one associated feature value, if not dozens or more, according to various embodiments.

ML system 120 may build a machine learning classifier using previous data. In the case of transaction classifiers, there may be hundreds, thousands, or more of previously executed transactions for which a final outcome is known—e.g., fraudulent or not fraudulent. These data can be used to adjust a classifier in order to detect characteristics of transactions that belong to a particular classification (e.g. fraudulent). The discussion herein often focuses on the "fraud/not fraud" transaction classification question, but note that the techniques described in this application can be applied to many different other classifications for transactions, as well as generally to classification of other types of events.

In the case of a machine learning classifier involving decision trees, each of the decision trees may be individually trained using various criteria. In the resulting classifier, each decision tree may receive a particular vote (weighted or not) on whether an event fits a particular classification. In the case of fraud determination, for example, an ensemble of 500 decision trees might be presented with a new, not yet classified transaction. In this ensemble, 460 trees might determine the transaction represents fraud, while 40 other trees indicate the transaction is legitimate. The classifier as a whole might then designate that transaction as representative of fraud (e.g. assuming a threshold of 90% certainty, for example, which would require 450 trees in this example). In a decision tree classifier, each of the trees may evaluate an event (such as a transaction) based on a subset of features in a feature space. Such techniques can help avoid data overfitting.

In operation 420, ML system 120 evaluates a plurality of branch paths in a candidate tree for transaction classification performance using a set of evaluation transaction data, and may perform this operation for each of one or more candidate trees in a plurality of decision trees, according to various embodiments.

This operation can include traversing paths within different decision trees to try to identify new and useful classification rules. Using decision tree 300 from FIG. 3 as an example, one path for this tree might start at decision point 315, then go to decision point 325, then decision point 330, and terminate at (or prior to) score 365. In this example path, values for features X, Y, and Z would be evaluated along the way. So, this example path would give rise to a possible candidate classification rule that looks like:

Possible Candidate Rule #1: (X>3.7) && (Y≥0.86329) && (Z<5.0002)

This possible candidate rule can then be evaluated for transaction classification performance using a set of evaluation transaction data. That is, looking at a quantity of transactions for which a classification outcome is known, ML system 120 can determine whether or not the possible candidate rule is effective in reaching a classification (e.g. fraud or not fraud). If the possible candidate rule performs well enough (meeting certain thresholds and/or criteria), then that rule can be edited and/or suggested to a human user for inclusion in a classification platform, such as a fraud detection platform.

Consider an evaluation set that includes 20,000 previous transactions. Possible Candidate Rule #1 can then be applied to these 20,000 transactions. This process will result in a sub-set of the 20,000 transactions for which Possible Candidate Rule #1 is satisfied (when Feature X is greater than 3.7, Feature Y is greater or equal to 0.82329, and Feature Z is less than 5.0002). The evaluation set of previous transactions can come from one or more sources in various embodiments. In some instances, a particular entity (e.g. a large bank that issues credit cards) may use its own previous transactions as an evaluation data set. Transactions involving multiple different entities (e.g. different issuing banks) can also be combined to make up an evaluation data set—for example, an entity that does not have a large set of its own transactions could be grouped with other similarly situated entities to create the evaluation data set.

Continuing this example of branch path evaluation, assume that 500 of the 20,000 evaluation transactions satisfy Possible Candidate Rule #1. Using this sub-set of 500 qualifying transactions, the ability of Possible Candidate Rule #1 to classify transactions can then be evaluated. One or more particular evaluation criteria can be used when evaluating a candidate rule. Precision and recall can be used as evaluation criteria; in some embodiments, a default value of 0.5 for precision and 0.1 for recall can be used—however these values may vary and can also be accordingly specified by an end user.

One evaluation criterion that may be used is an $F_\beta$ (F beta) score related to precision and recall using the formula:

$$F\beta = (1 + \beta^2) \times \frac{(\text{precision} \times \text{recall})}{((\beta^2 \times \text{precision}) + \text{recall})}$$

For this formula, precision is defined as the ratio of true positives to the total number of true positives plus false positives. If there are 70 true positives and 30 false positives, precision is 0.7 (70/100). Recall is defined, for this formula, as the ratio of true positives to the total number of all positives (true positives plus false negatives). If there are 70 true positives and 70 false negatives, then recall is 0.5 (70/140). In this formula, Beta (β) is a non-negative real number.

In the 500 qualifying transactions in this example, there may be 400 transactions that are actually known to be fraudulent (true positive) and 100 that are actually non-fraudulent (false positive). There may be an additional 200 transactions in the original 20,000 that are also fraudulent but were not identified by Possible Candidate Rule #1 (false negative). Again, recall that these outcomes are already known within the evaluation data set, according to various embodiments. The remaining 19,300 transactions in the evaluation set are all true negatives in this example. $F_\beta$ can then be calculated using these numbers. Other evaluation criteria can also be used to measure the effectiveness of a candidate rule. A criterion that only measures precision or only measures recall could be used, for example. Different criteria may be used in different embodiments.

In some embodiments, every possible starting node in a decision tree will be evaluated for all branch paths that emanate from that node—e.g., all branch paths that meet one or more path selection criteria, such as a minimum and/or maximum depth relating a quantity of different features. Parameters for possible candidate classification rules can thus include, for example, requiring that a candidate classification rule have exactly four different features, requiring that a rule have at least three but no more than five different features, requiring that a rule have at least some quantity of categorical values (e.g. country code, type of funding source) or at least some quantity of numerical categorical values. Various requirements may be set in different embodiments.

Evaluating a particular branch path within a decision tree can include, in various embodiments, selecting a starting node within a given candidate tree. This starting node can be a root node (e.g., decision point 315 in decision tree 300) or can be a non-root node (e.g., intermediate decision point 325 in decision tree 300). Evaluating a branch path can thus include traversing a path from a starting node to an ending node within the given candidate tree, and constructing a possible candidate rule for the traversed path based on a feature value for each respective node in the traversed path. This operation includes using a feature value at each node to construct the possible candidate rule according to various embodiments. Feature values found at decision points (nodes) 315, 325, and 330 of decision tree 300 may dictate what the possible candidate rule looks like, as shown above in the example of Possible Candidate Rule #1. Each possible candidate rule—arising from different branch paths in a decision tree—can be evaluated for performance using a set of evaluation transaction data.

Machine learning classifiers may have many different decision trees (e.g. dozens, hundreds, thousands). In terms of classification, some of these trees may perform better than others—that is, one particular tree may generally do a good job at determining whether various electronic payment transactions are representative of fraud, while another tree may do a mediocre or even poor job.

To save processing and calculation time, underperforming decision trees may be skipped when generating possible candidate transaction classification rules. ML system 120 may thus determine whether or not to evaluate a particular one of a plurality of decision trees for possible candidate rules based on whether that particular decision tree meets one or more tree traversal suitability criteria. The tree traversal suitability criteria can include precision and/or recall of the decision tree, with respect to evaluation data.

Consider a set of evaluation data with 10,000 transactions, of which 600 are fraudulent and 9,400 of which are not fraudulent. Now assume a first decision tree correctly identifies 250 of the 10,000 transactions as being fraudulent but fails to identify the other 350 fraudulent transactions. This gives the tree a recall of 0.417 (250/600). Further assume this decision tree identifies the remaining 9,750 transactions as not fraudulent (that is, there are no false positives). This would give the tree a precision of 1.00—every single one of the transactions classified as fraud was indeed fraudulent.

Whether this example decision tree should be evaluated to see if that tree contains any well performing branch paths (possible candidate rules) depends on the tree traversal suitability criteria. These criteria might include recall>50% and precision>90%. In this example, the tree meets the precision criterion, but fails the recall criterion, and the tree would not be evaluated. This allows lower performing trees to be skipped when there may be many different possible trees to evaluate, as these lower performing trees may be significantly less likely to yield any useful candidate classification rules. An F beta ($F_\beta$) score can also be used as a tree traversal suitability criterion, as can other formulas. Various different evaluation data can be used to determine whether to evaluate a decision tree.

In operation 430, ML system 120 identifies one or more candidate transaction classification rules based on evaluating the transaction classification performance of various branch paths in operation 420, according to some embodiments.

As described above, different branch paths from one or more different decision trees can be used to create different possible candidate transaction classification rules. If a particular possible candidate transaction classification rule meets a certain performance threshold (e.g. a particular $F_\beta$ score is met), then that rule is identified as a candidate transaction classification rule. Candidate classification rules may then be presented to a human user as a suggestion for adoption into a classification platform—for example, a human analyst at an entity that handles financial transactions may decide to add a suggested rule to a fraud classification system.

Before presentation to a human user, candidate transaction classification rules may also be edited for better legibility. ML system 120 may automatically edit one or more candidate transaction classification rules, without human intervention, in order to accomplish this. Editing can be performed according to various criteria.

Consider a Candidate Rule #2:
(Country_USA>0.5) && (X>2) && (Y≥0.86329) && (Z<5.0002)

One form of editing for this rule can include reducing a length of a numeric feature value included in the rule. Numbers with large numbers of digits, for example, may be less understandable to a human user. In the rule above, the values for Y and and Z include five significant digits. The automatic editing process can attempt to shorten these values.

The value of Y could be shortened to 0.8633, and then the candidate rule can be re-evaluated to see if its performance has not dropped significantly (e.g., does precision, recall, and/or $F_\beta$ stay within 2% of the original performance?). Different thresholds can be used to determine acceptability of an edit to a numeric value length. If the shortened value for Y of 0.8633 performs well enough, the value could be further shortened and re-evaluated. Values of 0.863, 0.86, and 0.9 could all be tested and evaluated. Likewise, the value of Z could be shortened and evaluated for suitability. If the editing process sees a significant enough performance hit (e.g. past a threshold) when shortening a numeric value, the numeric value can be fixed at whatever shortest value still provided acceptable performance. Thus, ML system 120 can iteratively edit a particular candidate transaction classification rule for better legibility but automatically cease when performance evaluation of the iteratively edited versions of the particular transaction classification rule degrades past a threshold. In some cases, the editing process for a numeric value may stop whenever a value is shortened within a limit—e.g., two significant digits—so when Y reaches value 0.86, there may be no need to see what happens when Y is shortened to 0.9.

Machine learning models often use numeric values even for categories—in the example above, one feature value in the rule is that "Country_USA" is greater than 0.5. This syntax may not be easily understood by a human. Thus, the editing process for a candidate rule can also include replacing a numeric value for a categorical feature with a conditional value. The statement "Country_USA>0.5" might be replaced by a conditional that reads "Country==USA". Different categorical values may be replaced in such a manner to provide better legibility without affecting performance at all, in various embodiments.

When editing a candidate rule, ML system 120 may thus perform a performance evaluation of the edited candidate transaction rule against at least a portion of a set of evaluation transaction data and determine whether to retain the edited candidate transaction rule based on results of the performance evaluation. In some cases, candidate rules may be discarded and not presented to a human user for consideration if the candidate rule fails legibility criteria and trying to improve legibility of the rule degrades the performance of the rule past a threshold.

For example, a minimum legibility threshold parameter might state that any rule to be presented to a user must not have more than three significant digits in a numerical value. A candidate rule might have the condition (B<101.5), which has four significant digits. But when evaluating the shortened condition (B<102), the performance of the candidate rule may drop to an unacceptable level—and thus, the candidate rule might not be presented to a human user at all (either in edited form or un-edited form), in some embodiments.

Additional checks can be performed before presenting a candidate classification rule to a human user for possible adoption. Particularly, a rule can be evaluated against other rules to determine whether the rule meets at least a threshold level of difference from each of the other rules.

More specifically—it might not be desirable to present a candidate rule that is highly similar to an already existing rule. Consider the following rules:

Existing Rule A: (State==California) && (PurchasePrice>$2,000) && (MerchantType==Restaurant) && (TimeOfDay<1800)

Candidate Rule B: (City==SanFrancisco) && (PurchasePrice>$3,000) && (MerchantType==Restaurant) && (TimeOfDay<1745)

Existing Rule A would deny a transaction at restaurants within the state of California if they occur before 6 p.m. in the evening and exceed $2,000. Candidate Rule B would deny a transaction at restaurants within the city of San Francisco (California) if they occur before 5:45 p.m. in the evening and exceed $3,000. This candidate rule might be too similar to an existing rule and is thus not desirable to present to a user for possible inclusion in a fraud detection system.

At least two specific checks can be performed when evaluating a candidate rule against other existing rules. One check can include looking at the features in the candidate rule compared to other rules, and if a threshold number of features overlap with an existing rule, then the candidate rule will not be presented. The threshold could be set at 67% overlap, 74.9% overlap, or some other value. For example, if an existing rule operates on features A, B, C, and D and a candidate rule operates on features A, B, C, and E, then there is a 75% overlap in features (A, B, and C are common features to each rule). If the feature overlap threshold is set to 74.9%, then the candidate rule would not be presented to a human user as it operates on features that are too similar to an existing rule.

Another check can look at underlying transactions to see if the candidate rule appears to be catching fraudulent transactions that are not caught by already existing rules. Assume an evaluation data set of 20,000 transactions, for example, in which 500 transactions are fraudulent. Existing rules might catch 400 of these 500 transactions. The candidate rule catches 250 transactions out of the 20,000 transactions. However, of these 250 transactions, 248 of them are already caught by other rules. Thus, the new rule is only catching a net total of two fraudulent transactions that were not already previously captured by other existing rules. The "lift" of the candidate rule might thus be 2/400, or 0.5%. If this lift is below a threshold value (e.g. 3%, 5%, 10%, or some other value) then the candidate transaction might also not be presented to a human user, as it may not provide a significant difference to overall classification results.

Candidate classification rules can be presented to a human user in either edited or un-edited form, in various embodiments. The rule can be displayed on a video interface for example. The user may then have the option of selecting a presented rule for adoption into a classification system, such as a fraud detection system.

The techniques of the present disclosure thus allow for classification rules to be discovered using machine learning techniques, but for those classification rules to meet various criteria for human understanding and/or legibility. A human analyst can then adopt a newly proposed rule with some degree of confidence that the rule makes sense, i.e., fits some sort of segment of financial transaction fraud in an understandable manner. This is in contrast to some possible rules that might occur using machine learning, where for example a dozen different feature values, some of which might have a large number of digits, might be combined in a way that is almost totally opaque to a human user.

Once a candidate rule is adopted into a classification system such as a fraud detection system, that rule may be then be applied in real-time to classify unknown data items. A credit card transaction, for example, could be evaluated by the newly adopted candidate rule. If the candidate rule indicates that card transaction is indicative of fraud, the transaction might be denied by an issuing bank that is using the new rule. The technology described herein thus has the additional benefits of preventing financial loss, in various instances. Accordingly, a system can apply an adopted transaction classification rule to a plurality of real-time transactions to determine whether to approve completion of the plurality of real-time transactions (e.g. multiple real time electronic payment transactions may be evaluated for fraud using a newly adopted rule).

Computer-Readable Medium

Figure 5:
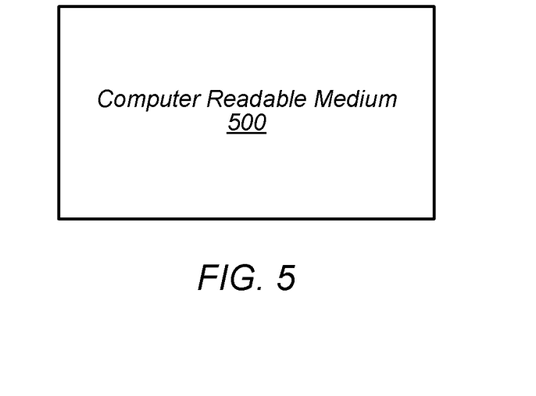
FIG. 5 is a diagram of a computer readable medium, according to some embodiments.

Turning to FIG. 5, a block diagram of one embodiment of a computer-readable medium 500 is shown. This computer-readable medium may store instructions corresponding to the operations of FIG. 4 and/or any techniques described herein. Thus, in one embodiment, instructions corresponding to machine learning system 120 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 6:
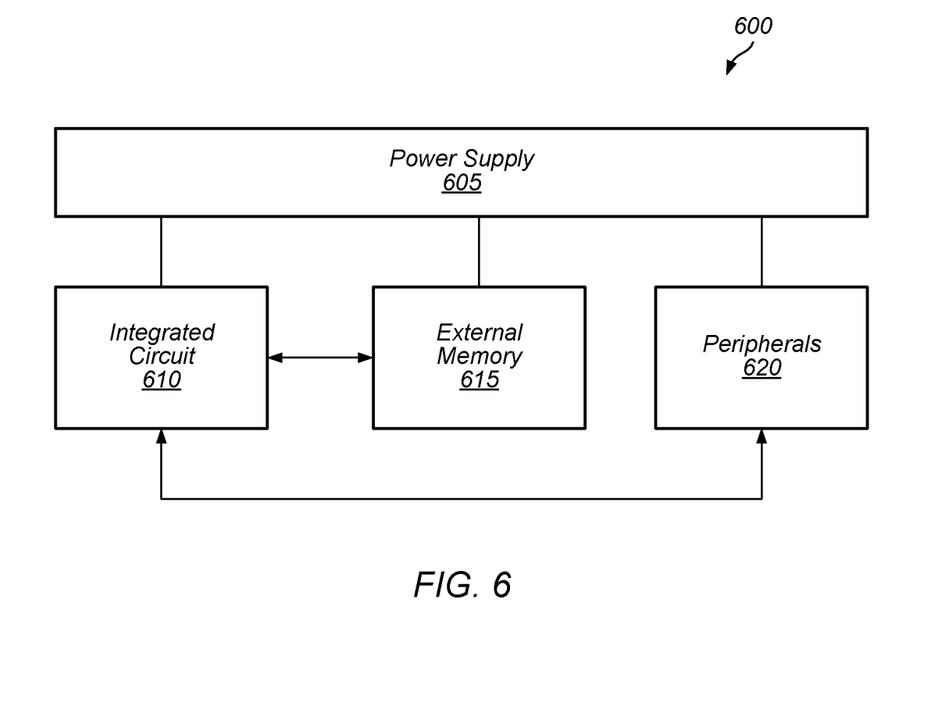
FIG. 6 is a block diagram of a system, according to some embodiments.

In FIG. 6, one embodiment of a computer system 600 is illustrated. Various embodiments of this system may be machine learning system 120, transaction system 160, or any other computer system as discussed above and herein.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as Wi-Fi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    accessing, by a computer system, a machine learning classifier comprising a plurality of decision trees, wherein the machine learning classifier was built using transaction data for a plurality of transactions, each of the plurality of transactions having a plurality of associated feature values for a feature space comprising a plurality of features;
    for each of one or more candidate trees of the plurality of decision trees, the computer system evaluating a plurality of branch paths in that candidate tree for a transaction classification performance using a set of evaluation transaction data;
    based on the evaluating, the computer system identifying one or more candidate transaction classification rules;
    automatically without human intervention, editing a particular candidate transaction classification rule of the one or more candidate transaction classification rules, wherein the editing comprises reducing a number of digits of a numeric feature value included in the particular candidate transaction classification rule;
    comparing a transaction classification performance of the edited particular candidate transaction classification rule against a specified threshold; and
    further editing, based on the comparing, the particular candidate transaction classification rule at least in part by further reducing the number of digits of the numeric feature value.

2. The method of claim 1, wherein for a given candidate tree of the one or more candidate trees, the method further comprises evaluating a particular one of the plurality of branch paths by:
    selecting a starting node within the given candidate tree;
    traversing a path from the starting node to an ending node within the given candidate tree;
    constructing a possible candidate rule for the traversed path based on a feature value for each respective node in the traversed path; and
    evaluating a performance of the possible candidate rule using the set of evaluation transaction data.

3. The method of claim 2, wherein the starting node is a root node of the given candidate tree.

4. The method of claim 2, wherein the starting node is an intermediate node of the given candidate tree.

5. The method of claim 2, wherein a depth of the path is specified as a parameter for the evaluating of the plurality of branch paths.

6. The method of claim 1, further comprising:
    determining whether or not to evaluate a particular decision tree of one of the plurality of decision trees for possible candidate rules based on whether the particular decision tree meets one or more tree traversal suitability criteria.

7. The method of claim 6, wherein the one or more tree traversal suitability criteria include at least one of a precision or a recall for at least a portion of the set of evaluation transaction data.

8. The method of claim 1, wherein the machine learning classifier comprising the plurality of decision trees is a random forest machine learning classifier.

9. The method of claim 1, wherein the automatically editing the particular candidate transaction classification rule further comprises replacing a numeric value for a categorical feature included in the particular candidate transaction classification rule with a conditional value for the categorical feature.

10. The method of claim 1, further comprising:
    iteratively performing the editing, the comparing, and the further editing until the comparing indicates that the transaction classification performance of the edited particular candidate transaction classification rule is below the specified threshold.

11. A system, comprising:
    a processor; and
    a memory having stored thereon instructions that are executable by the processor to cause the system to perform operations comprising:

building a machine learning classifier comprising a plurality of decision trees, wherein the machine learning classifier is built using transaction data for a plurality of transactions, each of the plurality of transactions having a plurality of associated feature values for a feature space comprising a plurality of features;

for each of one or more candidate trees of the plurality of decision trees, evaluating a plurality of branch paths in that candidate tree for a transaction classification performance using a set of evaluation transaction data;

based on the evaluating, identifying one or more candidate transaction classification rules;

automatically editing a first candidate transaction classification rule of the one or more candidate transaction classification rules, wherein the editing comprises reducing a number of digits of a numeric feature value included in the first candidate transaction classification rule;

evaluating a transaction classification performance of the edited first candidate transaction classification rule;

determining, based on a result of the evaluating, that the edited first candidate transaction classification rule can be further edited; and further reducing, based on the determining, the number of digits of the numeric feature value.

12. The system of claim 11, wherein the operations further comprise:

presenting, via an interface of the system to a human user, one or more edited versions of the candidate transaction classification rules that are selectable by the human user for adoption into a fraud detection system.

13. The system of claim 11, wherein the operations further comprise:

adopting, within a fraud detection system, a particular one of the identified one or more candidate transaction classification rules; and applying the adopted transaction classification rule to a plurality of real-time transactions to determine whether to approve completion of the plurality of real-time transactions.

14. The system of claim 11, wherein for a given candidate tree of the candidate trees, the operations further comprise evaluating a particular one of the plurality of branch paths by:

selecting a starting node within the given candidate tree;
traversing a path from the starting node to an ending node within the given candidate tree;
constructing a possible candidate rule for the traversed path based on a feature value for each respective node in the traversed path; and
evaluating a performance of the possible candidate rule using the set of evaluation transaction data.

15. A non-transitory computer-readable medium having stored thereon instructions that are executable by a computer system to cause the computer system to perform operations comprising:

accessing a machine learning classifier comprising a plurality of decision trees, wherein the machine learning classifier was built using transaction data for a plurality of transactions, each of the plurality of transactions having a plurality of associated feature values for a feature space comprising a plurality of features;

for each of one or more candidate trees of the plurality of decision trees, evaluating a plurality of branch paths in that candidate tree fora transaction classification performance using a set of evaluation transaction data;

based on the evaluating, identifying one or more candidate transaction classification rules;

automatically editing, without human intervention, at least a particular candidate transaction classification rule of the or more candidate transaction classification rules by changing at least one feature value in the particular candidate transaction classification rule, wherein the automatically editing comprises reducing a number of digits of the at least one feature value;

evaluating a transaction classification performance of the edited particular candidate transaction classification rule;

determining, based on a set of criteria and a result of the evaluating, whether the edited particular candidate transaction classification rule can be further edited; and further editing, based on a determination that the edited particular candidate transaction classification rule can be further edited, the particular candidate transaction classification rule at least in part by further reducing the number of digits of the at least one feature value.

16. The non-transitory computer-readable medium of claim 15, wherein the operations further comprise:

presenting the particular transaction classification rule to a human user.

17. The non-transitory computer-readable medium of claim 16, wherein the operations further comprise:

prior to the presenting, evaluating the particular candidate transaction classification rule against a set of other rules in a fraud detection system to determine whether the particular candidate transaction classification rule meets at least a threshold level of difference from each of the set of other rules.

18. The non-transitory computer-readable medium of claim 15, wherein automatically editing the particular candidate transaction classification rule is performed based on one or more particular feature values in that particular not meeting one or more predetermined legibility criteria.

19. The non-transitory computer-readable medium of claim 15, wherein the automatically editing, the evaluating, the determining, and the further editing are performed repeatedly until the number of digits is reduced below a specified threshold.

20. The non-transitory computer-readable medium of claim 15, wherein the automatically editing the particular candidate transaction classification rule further comprises replacing a numeric value for a categorical feature included in the particular candidate transaction classification rule with a conditional value for the categorical feature.

* * * * *